(12) United States Patent
Myers

(10) Patent No.: US 9,426,976 B2
(45) Date of Patent: Aug. 30, 2016

(54) APPARATUS FOR CAPTURING GAME OR PESTS

(71) Applicant: Spreader Technologies LP, San Antonio, TX (US)

(72) Inventor: Anthony E. Myers, San Antonio, TX (US)

(73) Assignee: Spreader Technologies, LP, San Antonio, TX (US)

( * ) Notice: Subject to any disclaimer, the term of this patent is extended or adjusted under 35 U.S.C. 154(b) by 86 days.

(21) Appl. No.: 14/553,374

(22) Filed: Nov. 25, 2014

(65) Prior Publication Data

US 2016/0143263 A1    May 26, 2016

(51) Int. Cl.
*A01M 23/24*    (2006.01)
*A01M 23/34*    (2006.01)

(52) U.S. Cl.
CPC .................................... *A01M 23/34* (2013.01)

(58) Field of Classification Search
USPC .................................................. 43/87, 85, 86
See application file for complete search history.

(56) References Cited

U.S. PATENT DOCUMENTS

| | | | | |
|---|---|---|---|---|
| 2,200,617 A * | 5/1940 | Clover | ............... | A01M 23/34 43/87 |
| 4,208,827 A * | 6/1980 | Starkey | ............... | A01M 23/34 43/87 |
| 4,389,807 A * | 6/1983 | Novak | ............... | A01M 23/34 43/87 |
| 4,581,844 A * | 4/1986 | Torkko | ............... | A01M 23/34 43/87 |
| 4,751,790 A * | 6/1988 | Thomas | ............... | A01M 23/34 43/85 |
| 6,016,624 A * | 1/2000 | Rose | ............... | A01M 23/34 43/87 |
| 9,095,132 B2 * | 8/2015 | Chang | ............... | A01M 23/34 |
| 2011/0265368 A1 * | 11/2011 | DeMers | ............... | A01M 23/34 43/87 |
| 2014/0202065 A1 * | 7/2014 | DeMers | ............... | A01M 23/34 43/87 |

* cited by examiner

*Primary Examiner* — Christopher P Ellis
(74) *Attorney, Agent, or Firm* — Christopher L. Makay

(57) ABSTRACT

A snare system includes a trap body including an aperture, a trigger plate assembly disposed within the trap body such that the trigger plate assembly is accessible through the aperture, a snare assembly placeable about the trap body, and at least one snare release assembly operatively linked with the trap body. The trigger plate assembly is movable between an armed position and an activated position. The snare release assembly normally biases the trigger plate assembly into the armed position. Furthermore, the snare release assembly disengages the snare assembly from the trap body when the trigger plate assembly moves from the armed position to the activated position. Upon disengagement from the trap body, the snare assembly moves to capture an animal's limb.

12 Claims, 6 Drawing Sheets

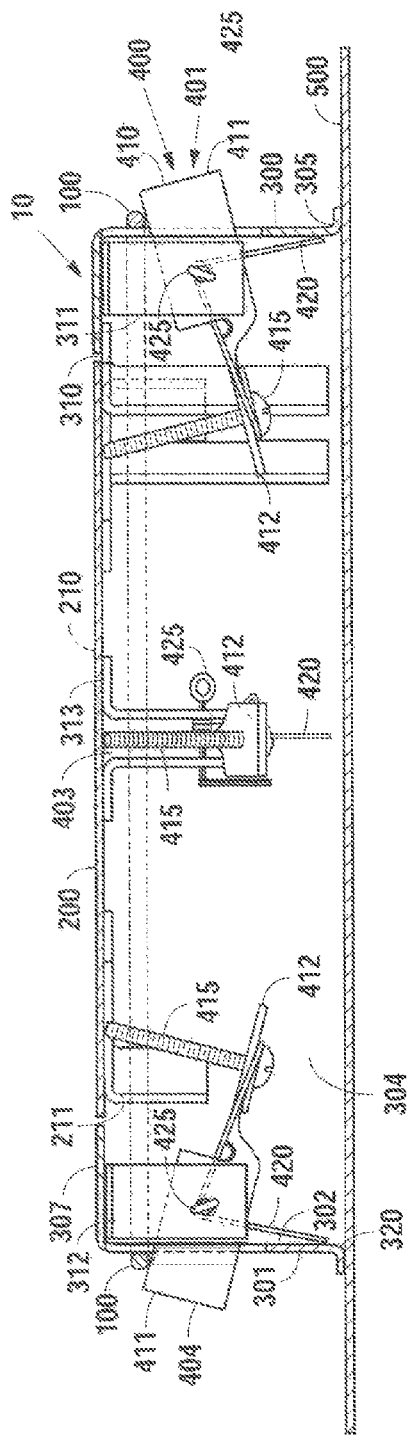
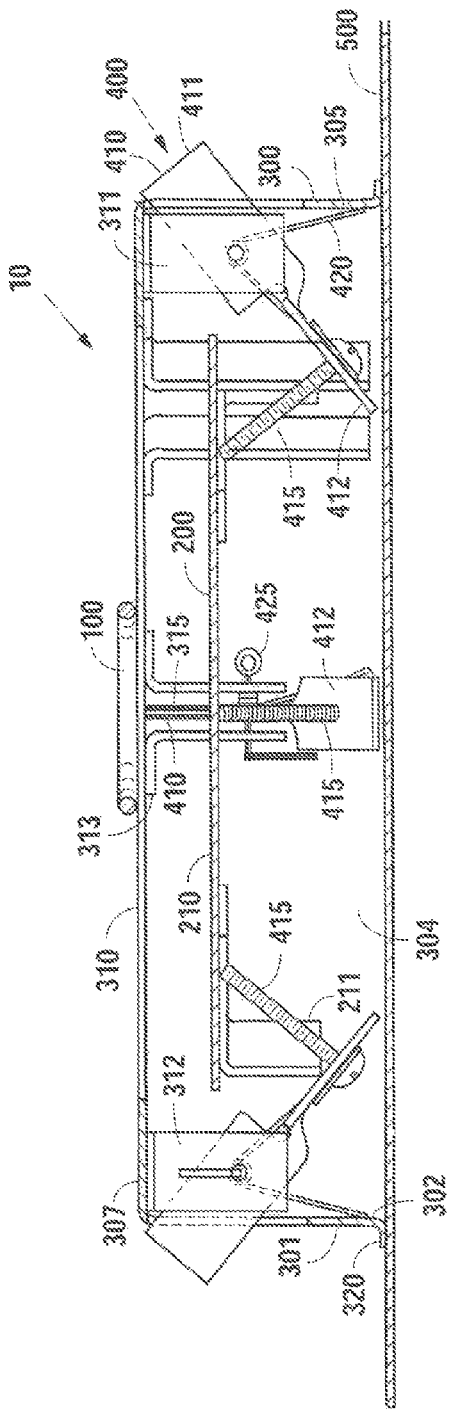

APPARATUS FOR CAPTURING GAME OR PESTS

BACKGROUND OF THE INVENTION

1. Field of the Invention

The present invention relates generally to an apparatus for capturing game or pests and, more particularly, but not by way of limitation to an apparatus that employs a snare.

2. Description of the Related Art

Trapping is the use of a device to remotely catch an animal and is employed for a variety of reasons, including hunting, pest control, and wildlife management. In particular, traps are effective in protecting livestock and agriculture from pests and predators such as coyotes and feral hogs.

Due to an exploding population and the lack of natural predators, feral hogs have become a problem in the United States. Feral hogs are omnivores and are opportunistic when it comes to food sources eating crops as well as livestock. In addition, to reach tubers and worms, feral hogs root the soil changing the soil's mineral properties as well as water infiltration rates, which has a negative impact on agriculture and vegetation.

Traps have become an effective way to control the feral hog population and limit their impact on agriculture, livestock, and the environment. Many different methods are used to trap feral hogs including box traps, corrals, and snares. Box traps and corrals are expensive, immobile, and may become less effective over time. Specifically, the feral hogs often learn from their keen sense of smell not to approach the box trap or corral. Conversely, snares are inexpensive, portable, and may be placed on trails and pathways that are used by feral hogs. Moreover, the snare and the triggering system for the snare can be buried to make the snare harder to detect for feral hogs and other pests or game. In addition, multiple snares may be employed in a given area to increase their effectiveness.

Accordingly, a game snare that is inexpensive, portable, and that can be buried would be useful.

SUMMARY OF THE INVENTION

In accordance with the present invention, a snare system comprises a trap body including an aperture, a trigger plate assembly disposed within the trap body, a snare assembly placeable about the trap body, and at least one snare release assembly operatively linked with the trap body.

The trap body includes a wall defining an opening and having an inner surface and an outer surface, a lip atop the wall that defines the aperture, at least one release slot in the wall, at least one hinge bracket disposed within the trap body that aligns with the release slot, and a bottom plate. A base secures to the bottom plate to cover the opening of the trap body.

The trigger plate assembly includes a trigger plate and legs coupled with the trigger plate. The trigger plate assembly inserts within the opening of the wall such that the legs abut the lip and the trigger plate aligns with the aperture. The trigger plate assembly is accessible through the aperture of the trap body and movable between an armed position and an activated position. In the armed position the legs abut the lip and the trigger plate aligns with the aperture.

The snare assembly includes a wire having a first end formed into a loop and second end. The snare assembly further includes a stop secured to the wire adjacent the loop and a swivel stop that receives the wire therethrough and couples with the second end of the wire to form a snare. The snare assembly still further includes a biasing member disposed over the wire between the stop and the swivel stop. The biasing member biases the swivel stop from a loading position to a capture position.

The snare release assembly includes a snare release coupled with the hinge bracket of the trap body that moves between a normally charged position and a release position. In addition, the snare release disengages the snare assembly from the trap body when the trigger plate assembly moves from the armed position to the activated position. The snare release assembly further includes an actuator coupled with the snare release and a biasing member coupled with the snare release.

The snare release includes a trigger tab and a snare tab. The trigger tab engages with the actuator and a first member of the biasing member. The snare tab engages with a coil of the biasing member and couples with the hinge bracket of the trap body. A second member of the biasing member abuts the inner surface of the wall of the trap body such that the biasing member biases the snare release into the normally charged position, whereby a portion of the snare tab extends through the release slot of the trap body. The portion of the snare tab extending through the release slot and the trap body form a pocket for receiving the snare assembly therein. Furthermore, in the normally charged position, the actuator contacts the trigger plate assembly to maintain the trigger plate assembly in the armed position.

When a force is applied to the trigger plate, the trigger plate overcomes the biasing member and moves the snare release from the normally charged position to the release position. As a result, the portion of the snare release extending through the release slot pivots to eliminate the pocket and release the snare assembly from the trap body. Upon release from the trap body, the biasing member of the snare assembly biases the swivel stop from the loading position to the capture position thereby ensnaring an animal's limb.

BRIEF DESCRIPTION OF DRAWINGS

FIG. 5 is a cross-sectional side view illustrating the snare system in an armed position.

FIG. 6 is a cross-sectional side view illustrating the snare system in a release position.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

Figure 1:
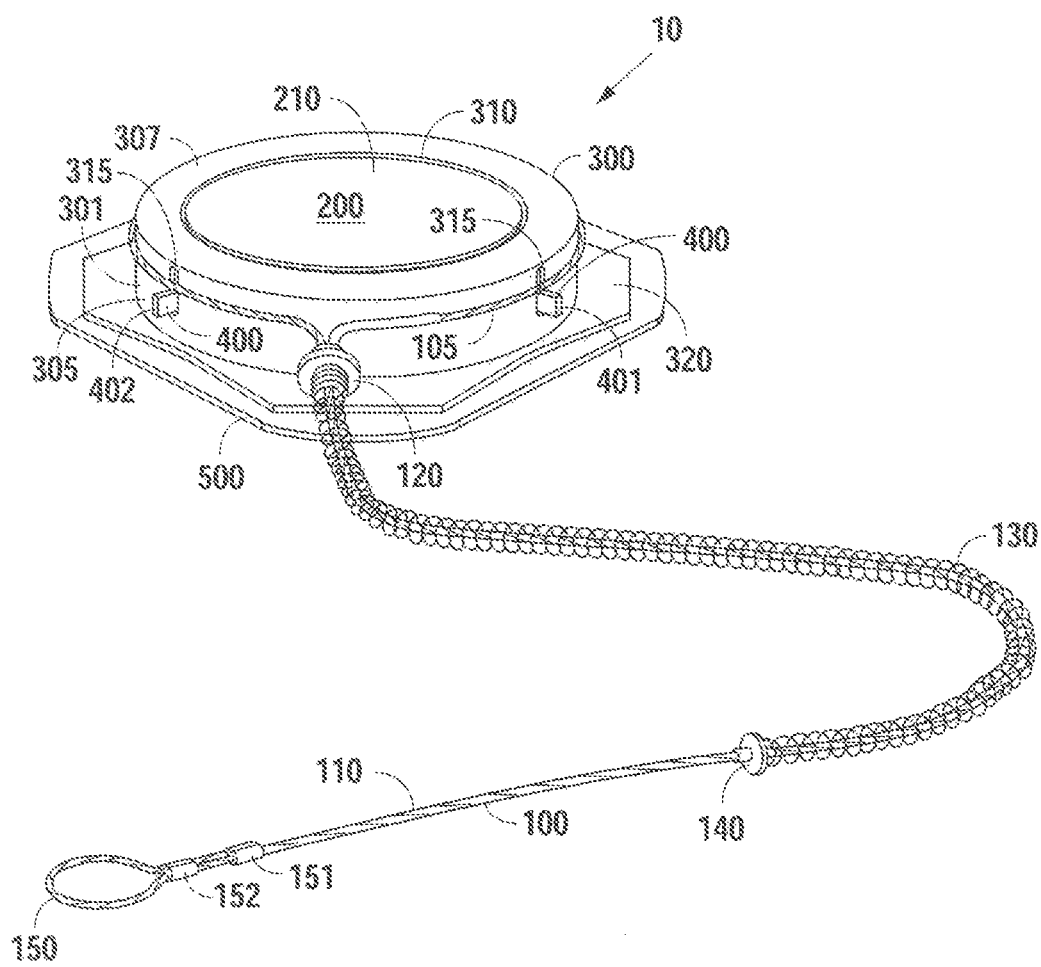
FIG. 1 is a perspective view illustrating a snare system according to the preferred embodiment.
Figure 2:
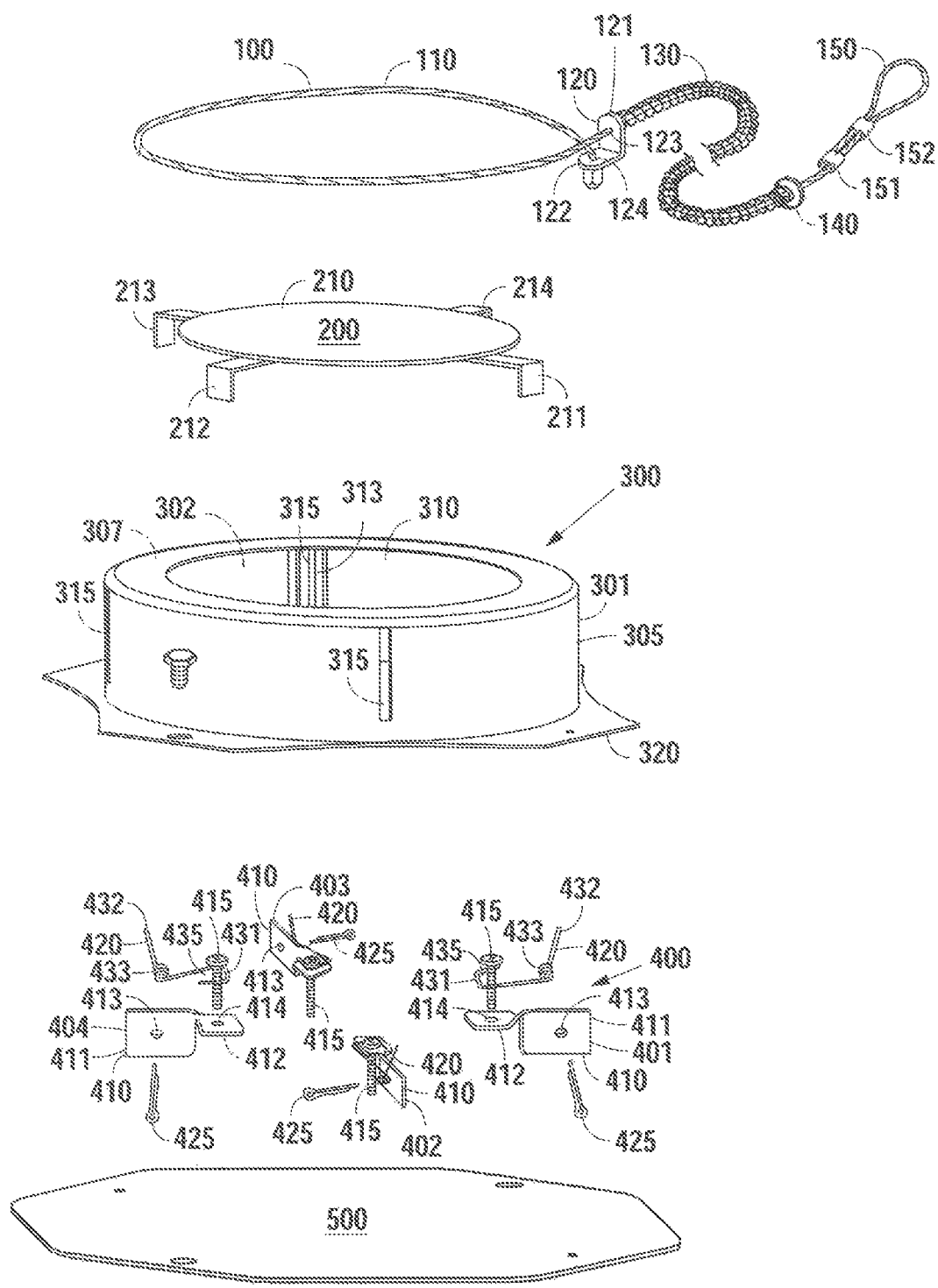
FIG. 2 is an exploded view illustrating the snare system.
Figure 3:
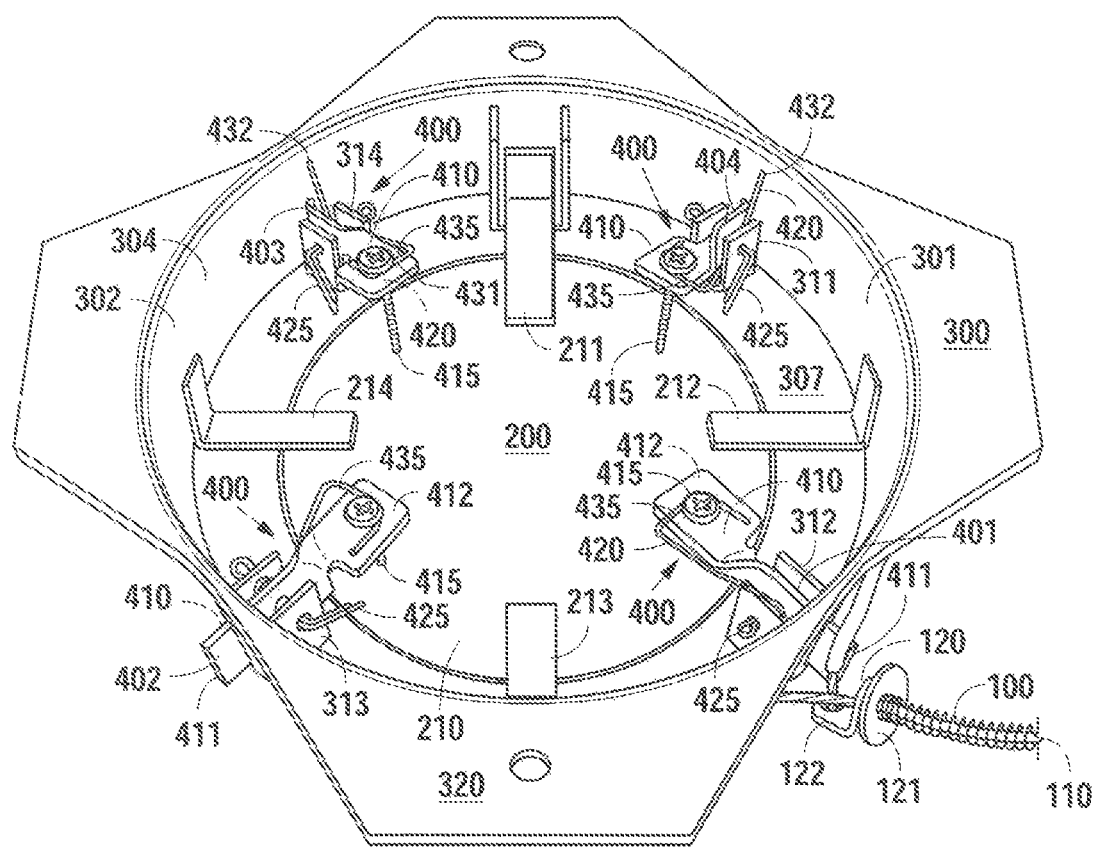
FIG. 3 is a bottom view in perspective illustrating the snare system.

FIGS. 1-3 illustrate a snare system 10. The snare system 10 includes a snare assembly 100, a trigger plate assembly 200, a trap body 300, a snare release system 400, and a base 500. The snare assembly 100 includes a wire 110, a swivel stop 120 that moves between a loading position and a capture position, a biasing member 130, a stop 140, and retaining clips 151 and 152. The wire 110 can be any suitable material, however, in the preferred embodiment the wire 110 is a steel cable. The swivel stop 120 includes a first member 121 and a second member 122. The first member 121 includes an aperture 123 that receives a second end of the wire 110 therethrough and the second member 122 includes an aperture 124 that receives and secures the second end of the wire 110. In particular, the second end of the wire 110 passes through the aperture 123 of the first member 121 and inserts into the aperture 124 of the second member 122. After the wire 110 inserts into aperture 124 of the second member, the wire 110 secures to the second member 122 using any suitable means such as a threaded nut. Once the wire 110 secures to the second member 122, the wire 110 forms a snare 105.

The stop 140 includes an aperture 145 that receives the first end of the wire 110 such that the wire 110 passes through the aperture 145. After passing through the aperture 145, the stop 140 secures to the wire 110 using any suitable means such as a friction fit created through crimping. Furthermore, once the first end of the wire 110 passes through the aperture 145 of the stop 140, the wire 110 forms a loop 150 that is maintained by the retaining clips 151 and 152. The loop 150 allows the snare assembly 100 to secure to an immobile object such as a tree, fence post, or stake.

The biasing member 130 inserts over the wire 110 such that a first end of the biasing member 130 abuts the stop 140 and a second end of the biasing member 130 abuts the first member 121 of the swivel stop 120. The biasing member 130 biases the swivel stop 120 from the loading position to the capture position. In the preferred embodiment, the biasing member 130 is a spring.

The snare assembly 100 assembles in the following manner. The aperture 145 of the stop 140 receives the first end of the wire 110 such that the wire 110 passes through the aperture 145. After passing through the aperture 145, the stop 140 secures to the wire 110 at a desired distance from the loop 150. Furthermore, once the first end of the wire 110 passes through the aperture 145 of the stop 140, the wire 110 forms the loop 150 wherein the retaining clips 151 and 152 are placed onto the wire 110 to maintain the loop 150. The biasing member 130 inserts over the wire 110 at the second end until the first end of the biasing member 130 abuts the stop 140. Thereafter, the second end of the wire 110 inserts through the first member 121 and into the second member 122 of the swivel stop 120. In particular, the second end of the wire 110 inserts through the aperture 123 of the first member 121 until the second end of the biasing member 130 abuts the first member 121. Furthermore, the second end of the wire 110 inserts and secures into aperture 124 of the second member 122 using any suitable means such as a threaded nut. After inserting through the aperture 123 of the first member 121 and securing to the second member 122, the wire 110 forms the snare 105.

The snare assembly 100 operates in the following manner. The loop 150 secures to an immobile object such as a tree, fence post, or stake. The biasing member 130 through engagement with the swivel stop 120 and the stop 140 biases the swivel stop 120 from the loading position to capture position. In particular, as the biasing member 130 biases the swivel stop 120 from the loading position to the capture position, the swivel stop 120 guided by the aperture 123 moves along the wire 110 such that the diameter of the snare 105 is reduced thereby allowing the capture of an animal's limb. Operation of snare assembly 100 in combination with the other components of the snare system 10 will be described in greater detail herein.

The trigger plate assembly 200 includes a trigger plate 210 and legs 211-214. The trigger plate 210 connects to the legs 211-214 using any suitable means such as welding. The trigger plate assembly 200 inserts within the trap body 300 and moves between an armed position and an activated position. Specifically, when an animal steps on the trigger plate 210 of the trigger plate assembly 200, the trigger plate assembly 200 moves from the armed position to the activated position. The legs 211-214 guide and maintain the trigger plate assembly 200 within the trap body 300 as the trigger plate assembly 200 moves between the armed position and the activated position. The movement of the trigger plate assembly 200 between armed position and the activated position will be explained in greater detail herein.

The trap body 300 includes a wall 301 defining an opening 304 and having an inner surface 302 and an outer surface 305, a lip 307 atop the wall 301 that defines an aperture 310, release slots 315 in the wall 301, and a bottom plate 320 that allows the trap body 300 to secure to the base 500. The trap body 300 further includes hinge brackets 311-314 that connect to the lip 307, the inner surface 302 of the wall 301, or both using any suitable means such as spot welding. The hinge brackets 311-314 align with a respective release slot 315 and include apertures 330 that allow the securing of the snare release system 400. The outer surface 305 of the wall 301 receives the snare assembly 100 when moved to the loading position.

The hinge brackets 311-314 receive the snare release system 400. In particular, a portion of the snare release system 400 secures within the hinge brackets 311-314 and allows the snare release system 400 to pivot within the hinge brackets 311-314. In addition, the release slots 315 of the trap body 300 receive a portion of the snare release system 400 that moves within the release slots 315 to release the snare assembly 100 from the trap body 300. The snare release system 400 is activated by the trigger plate assembly 200 resulting in a portion of the snare release system 400 pivoting within the hinge brackets 311-314 and a portion of the snare release system 400 moving upwards within the release slots 315 to release the snare assembly 100 from the outer surface 305 of the wall 301. Once the snare assembly 100 is released from the outer surface 305, the swivel stop 120 of the snare assembly 100 moves from the loading position to the capture position thereby reducing the diameter of the snare 105 and allowing the capture of an animal's limb.

The snare release system 400 includes snare release assemblies 401-404. The snare release assemblies 401-404 are identical and each includes a snare release 410, an actuator 415 which is a screw in the preferred embodiment, a biasing member 420, and a retaining clip 425. The snare release 410 includes a snare tab 411 and a trigger tab 412. The snare tab 411 includes an aperture 413 and the trigger tab 412 includes an aperture 414. The aperture 413 of the snare tab 411 receives the retaining clip 425 and the aperture 414 of the trigger tab 412 is threaded to receive the actuator 415. The biasing member 420 includes a first member 431, a second member 432, and a coil 433. The first member 431 of the biasing member 420 forms a loop 435.

The snare assemblies 401-404 assemble and install within the hinge brackets 311-314 of the trap body 300 in the following manner. The loop 435 of the biasing member 420 is placed onto the trigger tab 412. The actuator 415 inserts through the loop 435 of the biasing member 420 and through the aperture 414 of the trigger tab 412. The actuator 415 maintains the biasing member 420 engaged with the trigger tab 412. The snare assemblies 401-404 are placed within the hinge brackets 311-314 of the trap body 300 and the retaining clip 425 inserts through the apertures 330 of the hinge brackets 311-314, the aperture 413 of the snare tab 411, and the coil 433 of the biasing member 420. Insertion of the retaining clip 425 through the apertures 330 of the hinge brackets 311-314, the aperture 413 of the snare tab 411, and the coil 433 of the biasing member 420 allows the snare assemblies 401-404 to pivot within the hinge brackets 311-314. Furthermore, the retaining clip 425 is bendable to allow retention of the snare assemblies 401-404 within the hinge brackets 311-314.

After the snare assemblies 401-404 secure within the hinge brackets 311-314, a portion of the snare releases 410 of the snare assemblies 401-404 extends through the release slots 315 of the trap body 300, the biasing members 420 abut the inner surface 302 of the wall 301, and the actuators 415 reside against the trigger plate assembly 200. Specifically, the snare tabs 411 of the snare assemblies 401-404 insert through a respective release slot 315 of the trap body 300, the second members 432 of the biasing members 420 abut the inner surface 302 of the wall 301, and the actuators 415 reside against the trigger plate 210 of the trigger plate assembly 200. Once the actuators 415 of the snare release assemblies 401-404 reside against the trigger plate 210, the biasing members 420 of the snare assemblies 401-404 bias the trigger plate assembly 200 into the armed position. Likewise, the biasing members 420 of the snare assemblies 401-404 bias the snare releases 410 of the snare assemblies 401-404 into a normally charged position that allows placement of the snare assembly 100 around the trap body 300 in the loading position.

The snare releases 410 move between the normally charged position and a release position that disengages the snare assembly 100 from the trap body 300. Specifically, in the normally charged position, the snare tab 411 of the snare release 410 pivots away from the lip 307 to form a pocket 501 with the outer surface 305 of the wall 301. The pocket 501 receives the snare 105 of the snare assembly 100. Conversely, in moving to the release position, the snare tab 411 pivots towards the lip 307 to eliminate the pocket 500 and remove the snare 105 of the snare assembly 100 from the outer surface 305 of the trap body 300. As described above, removing the snare 105 of the snare assembly 100 from the outer surface 305 of the trap body 300 moves the swivel stop 120 of the snare assembly 100 from the loading position to the capture position.

The snare system 10 assembles in the following manner. As illustrated in FIG. 3, the trap body 300 is aligned such that the opening 304 of the wall faces upward and the lip 307 and aperture 310 faces downward. The trigger plate assembly 200 then inserts within the trap body 300. Specifically, the trigger plate assembly 200 inserts within the opening 304 of the wall 301 such that the legs 211-214 reside against the inner surface 302 of the wall 301 and the trigger plate 210 aligns with the lip 307 and the aperture 310. The snare release assemblies 401-404 are then installed and secured within the trap body 300 as described above. Once the snare release assemblies 401-404 are installed and secured within the trap body 300, the biasing members 420 of the snare assemblies 401-404 bias the trigger plate assembly 200 into the armed position. Likewise, the biasing members 420 of the snare assemblies 401-404 bias the snare releases 410 of the snare assemblies 401-404 into the normally charged position. The base 500 then connects to the bottom plate 320 of the trap body 300 using any suitable means such as bolts thereby sealing the trigger plate assembly 200 and the snare assemblies 401-404 within the trap body 300. After the trigger plate assembly 200 and the snare assemblies 401-404 seal within the trap body 300, the snare assembly 100 is ready for placement on the trap body 300.

Figure 4:
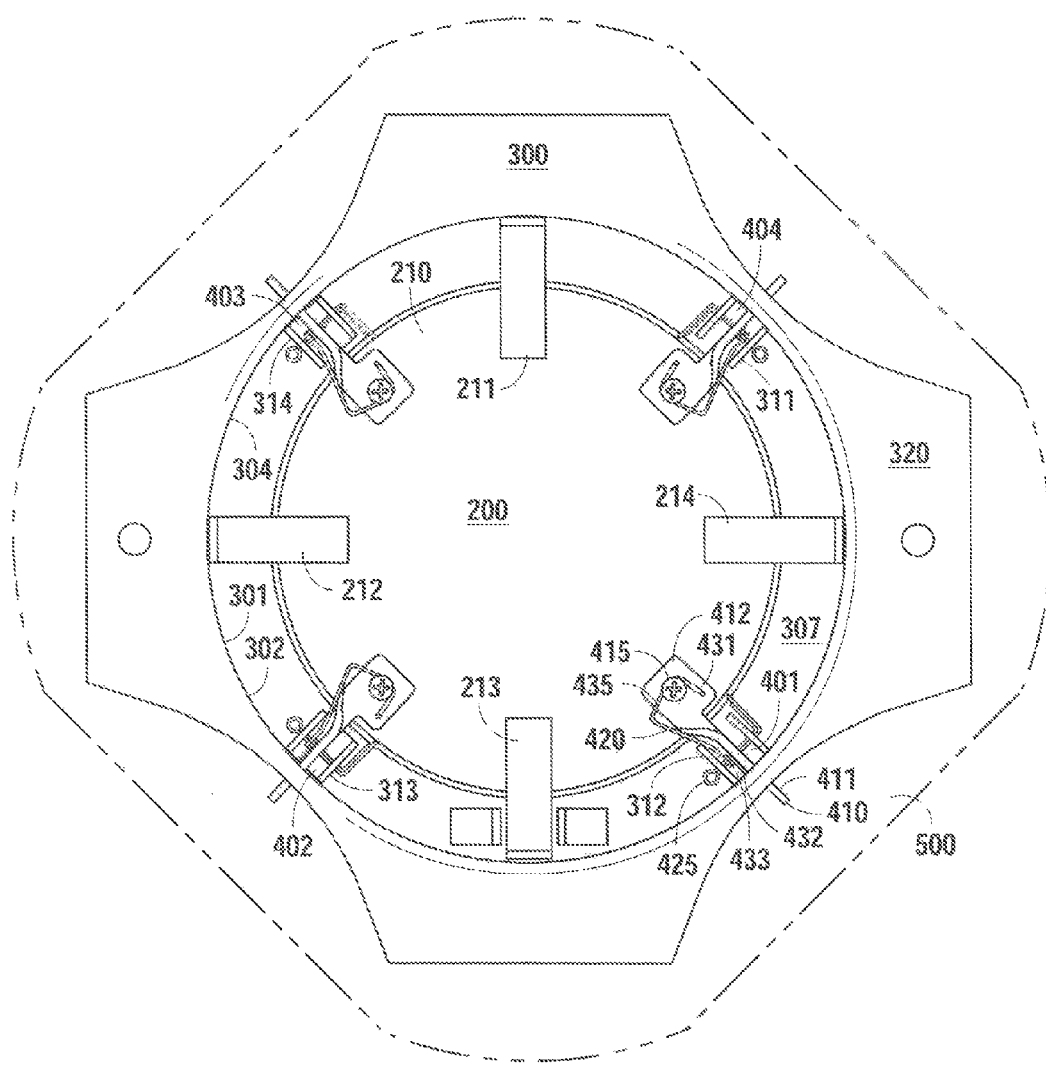
FIG. 4 is a bottom view illustrating the snare system.
Figure 7:
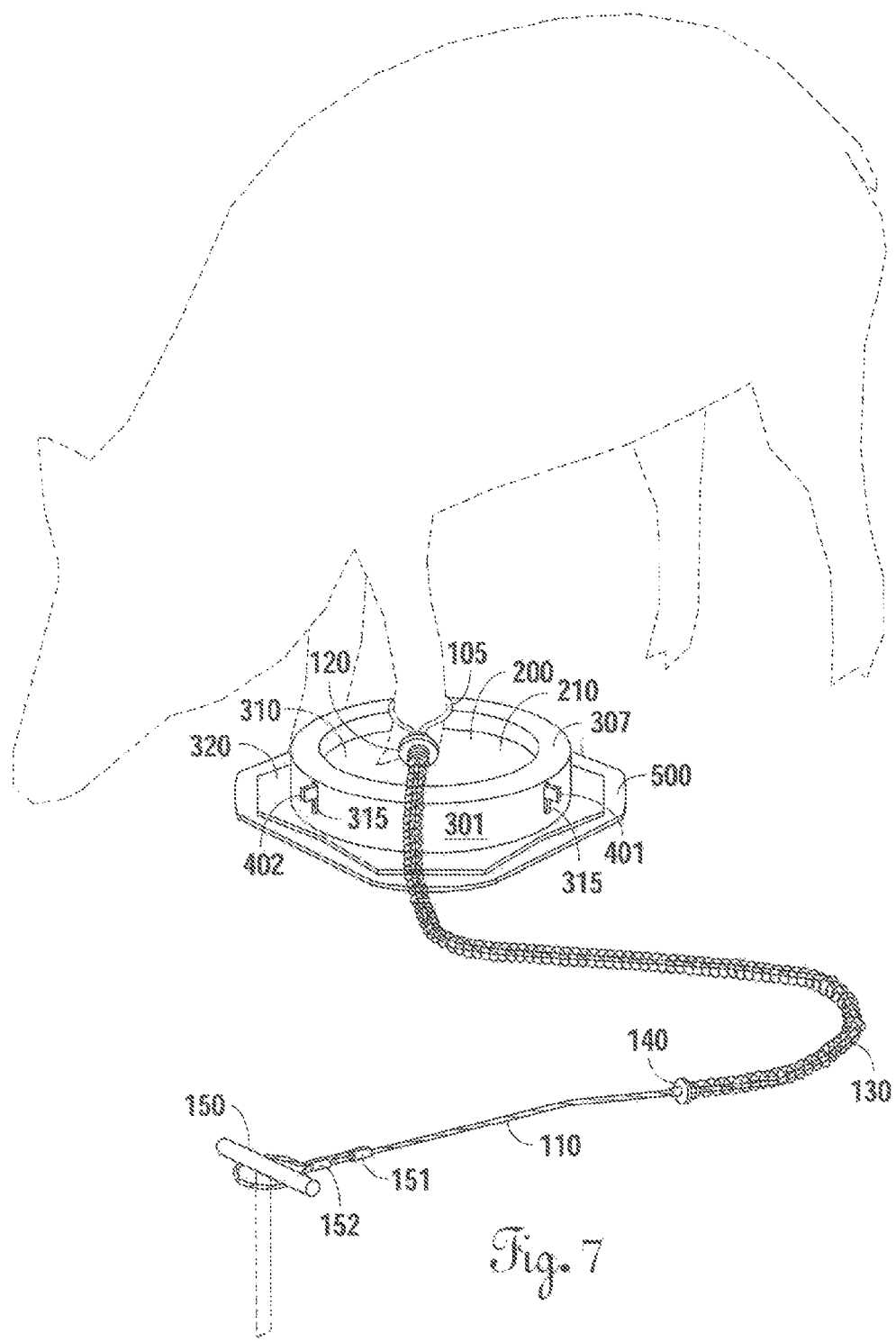
FIG. 7 is a perspective view illustrating the snare system capturing an animal's limb.

FIGS. 4-6 illustrate the trapping of an animal using the snare system 10. The operator locates a suitable position for the snare system 10. Once a suitable position is found, the trap body 300 is placed on the ground or buried such that the aperture 310 of the trap body 300 and the trigger plate 210 of the trigger plate assembly 200 is facing upward. As described above, the biasing member 420 of the snare assemblies 401-404 biases the snare release 410 of the snare assemblies 401-404 into the normally charged position and the trigger plate assembly 200 into the armed position. The loop 150 of the snare assembly 100 secures to an immobile object such as a tree, fence post, or stake. The swivel stop 120 of the snare assembly 100 is moved into the loading position and the snare 105 is placed over the outer surface 305 of the trap body 300 and into the pocket 500 formed by the snare release 410 of the snare release assemblies 401-404 and the outer surface 305 of the trap body 300.

When an animal such as a feral hog, coyote, or the like steps on the trigger plate 210 of the trigger plate assembly 200, pressure from the animal's weight overcomes the biasing members 420 of the snare assemblies 401-404 causing the trigger plate assembly 200 to move from the armed position to the activated position and the snare releases 410 of the snare assemblies 401-404 to move from the normally charged position to the release position. In particular, in moving from the armed position to the activated position, the trigger plate assembly 200 acting through the actuators 415 applies a force to the trigger tab 412 causing the snare releases 410 to move from the normally charged position to the release position. In moving to the release position, the snare tabs 411 of the snare releases 410 pivot towards the lip 307 to eliminate the pocket 500 and remove the snare 105 of the snare assembly 100 from the outer surface 305 of the trap body 300. Once the snare 105 is removed from the trap body 300, the biasing member 130 biases the swivel stop 120 of the snare assembly 100 from the loading position to the capture position. As illustrated in FIG. 6, the swivel stop 120 guided by the aperture 123 moves along the wire 110 such that the diameter of the snare 105 is reduced capturing the animal's limb.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description; rather, it is defined only by the claims that follow.

The invention claimed is:
1. A snare system, comprising:
a trap body including an aperture, the trap body comprising:
  a wall,
  at least one release slot in the wall, and
  at least one hinge bracket disposed within the trap body and aligned with the release slot;
a trigger plate assembly disposed within the trap body such that the trigger plate assembly is accessible through the aperture, wherein the trigger plate assembly is movable between an armed position and an activated position;

a snare assembly placeable about the trap body;

at least one snare release assembly operatively linked with the at least one hinge bracket such that a portion thereof extends through the at least one release slot, wherein the snare release assembly normally biases the trigger plate assembly into the armed position, further wherein the portion of the snare release assembly extending through the at least on release slot disengages the snare assembly from the trap body when the trigger plate assembly moves from the armed position to the activated position.

2. The snare system according to claim 1, wherein the trap body further comprises:
   the wall defining an opening and having an inner surface and an outer surface;
   a lip atop the wall that defines the aperture; and
   a bottom plate.

3. The snare system according to claim 2, wherein the trigger plate assembly comprises:
   a trigger plate; and
   legs coupled with the trigger plate, wherein the trigger plate assembly inserts within the opening of the wall such that the legs abut the lip and the trigger plate aligns with the aperture.

4. The snare system according to claim 3, wherein the snare release assembly biases the trigger plate assembly into the armed position such that the legs abut the lip and the trigger plate aligns with the aperture.

5. The snare system according to claim 3, wherein the snare release assembly comprises:
   a snare release coupled with the hinge bracket of the trap body, wherein the snare release is movable between a normally charged position and a release position;
   an actuator coupled with the snare release; and
   a biasing member coupled with the snare release, wherein the biasing member biases the snare release into the normally charged position such that the actuator contacts the trigger plate assembly to maintain the trigger plate assembly in the armed position.

6. The snare system according to claim 5, wherein a portion of the snare release extends through the release slot of the trap body, further wherein the biasing member biases the snare release into the normally charged position such that the portion of the snare release extending through the release slot and the trap body form a pocket for receiving the snare assembly therein.

7. The snare system according to claim 6, wherein a force applied to the trigger plate overcomes the biasing member and moves the snare release from the normally charged position to the release position, further wherein the portion of the snare release extending through the release slot pivots to eliminate the pocket and release the snare assembly from the trap body.

8. The snare system according to claim 7, wherein the snare release, comprises:
   a trigger tab engaged with the actuator and a first member of the biasing member; and
   a snare tab coupled with the hinge bracket of the trap body and having a portion thereof extending through the release slot of the trap body, wherein the snare tab is engaged with a coil of the biasing member, further wherein, a second member of the biasing member abuts the inner surface of the wall of the trap body such that the biasing member biases the snare release into the normally charged position.

9. The snare system according to claim 8, wherein the portion of the snare tab extending through the release slot and the trap body form the pocket for receiving the snare assembly therein.

10. The snare system according to claim 9, wherein a force applied to the trigger plate overcomes the biasing member and moves the snare release from the normally charged position to the release position, further wherein the portion of the snare tab extending through the release slot pivots to eliminate the pocket and release the snare assembly from the trap body.

11. The snare system according to claim 1, wherein the snare assembly comprises:
   a wire having a first end formed into a loop and second end;
   a stop secured to the wire adjacent the loop;
   a swivel stop that receives the wire therethrough and coupled with the second end of the wire to form a snare; and
   a biasing member disposed over the wire between the stop and the swivel stop, wherein the biasing member biases the swivel stop from a loading position to a capture position.

12. The snare system according to claim 2, further comprising a base securable to the bottom plate.

* * * * *